United States Patent
Liu et al.

(10) Patent No.: US 11,044,761 B2
(45) Date of Patent: Jun. 22, 2021

(54) COMMUNICATION METHOD, TERMINAL, AND NETWORK DEVICE

(71) Applicant: Huawei Technologies Co., Ltd., Shenzhen (CN)

(72) Inventors: Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 16/577,974

(22) Filed: Sep. 20, 2019

(65) Prior Publication Data

US 2020/0015284 A1  Jan. 9, 2020

Related U.S. Application Data (63) Continuation of application No. PCT/CN2018/079654, filed on Mar. 20, 2018.

(30) Foreign Application Priority Data

Mar. 20, 2017 (CN) .......................... 201710167011.2

(51) Int. Cl.
    *H04W 74/08* (2009.01)
(52) U.S. Cl.
    CPC ............................ *H04W 74/0833* (2013.01)
(58) Field of Classification Search
    USPC ....... 370/329, 330, 312, 350, 281, 331, 310, 370/468, 252, 328
    See application file for complete search history.

(56) References Cited

U.S. PATENT DOCUMENTS

| 2013/0301541 | A1 | 11/2013 | Mukherjee et al. |
| 2014/0341163 | A1* | 11/2014 | Zhang .................... H04B 7/024 370/329 |
| 2015/0124746 | A1 | 5/2015 | Wu et al. |
| 2016/0234809 | A1* | 8/2016 | Han ...................... H04L 1/1893 |

(Continued)

FOREIGN PATENT DOCUMENTS

| CN | 102271418 A | 12/2011 |
| CN | 102811496 A | 12/2012 |

(Continued)

OTHER PUBLICATIONS

"Discussion on PRACH configuration in NR," 3GPP TSG RAN WG1 Meeting #87, Reno, USA, R1-1611461, pp. 1-5, 3rd Generation Partnership Project, Valbonne, France (Nov. 14-18, 2016).

(Continued)

*Primary Examiner* — Joseph Arevalo
(74) *Attorney, Agent, or Firm* — Leydig, Voit & Mayer, Ltd.

(57) ABSTRACT

A communication method, a terminal, and a network device are provided. The method includes: determining, by a terminal, a first identifier based on a resource index number of a first resource, where the resource index number of the first resource is preset, or is indicated by a network device, the first resource is a resource used by the terminal to send a random access preamble, the first identifier is used to scramble first signaling, and the first signaling is used to schedule a random access response in a random access process; and detecting, by the terminal, the first signaling based on the first identifier.

14 Claims, 5 Drawing Sheets

(56) References Cited

U.S. PATENT DOCUMENTS

| | | | |
|---|---|---|---|
| 2016/0294514 A1* | 10/2016 | Tang | H04L 65/105 |
| 2017/0013643 A1* | 1/2017 | Nan | H04W 74/0833 |
| 2017/0215207 A1* | 7/2017 | Yl | H04L 5/0092 |
| 2017/0367003 A1* | 12/2017 | Zhang | H04W 72/0453 |
| 2018/0255585 A1* | 9/2018 | Tirronen | H04W 74/0833 |
| 2018/0288808 A1* | 10/2018 | Liu | H04W 72/0446 |
| 2018/0343683 A1* | 11/2018 | Shao | H04W 74/008 |
| 2019/0014598 A1* | 1/2019 | Yoshimura | H04W 16/14 |
| 2019/0268096 A1* | 8/2019 | Takeda | H04L 1/0068 |
| 2020/0083946 A1* | 3/2020 | You | H04W 76/19 |
| 2020/0146058 A1* | 5/2020 | Xu | H04L 5/0092 |
| 2020/0260495 A1* | 8/2020 | Kim | H04L 27/26025 |
| 2020/0305188 A1* | 9/2020 | Liu | H04W 56/0045 |
| 2020/0314908 A1* | 10/2020 | Hwang | H04B 7/02 |
| 2020/0358553 A1* | 11/2020 | Liu | H04W 24/08 |

FOREIGN PATENT DOCUMENTS

| | | |
|---|---|---|
| CN | 104619037 A | 5/2015 |
| WO | 2012177060 A2 | 12/2012 |
| WO | 2016144082 A1 | 9/2016 |

OTHER PUBLICATIONS

"NR PRACH design", 3GPP TSG-RAN WG1 NR adhoc, Spokane, USA, R1-1700298, pp. 1-22, 3rd Generation Partnership Project, Valbonne, France (Jan. 16-20, 2017).

"Discussion on NR 4-step RA Procedure," 3GPP TSG RAN WG1 AH_NR Meeting, Spokane, USA, R1-1700185, pp. 1-4, 3rd Generation Partnership Project, Valbonne, France (Jan. 16-20, 2017).

"Consideration on 2-step RA," 3GPP TSG RAN WG2 Meeting Ad Hoc, Spokane, USA, R2-1700205, pp. 1-6, 3rd Generation Partnership Project, Valbonne, France (Jan. 17-19, 2017).

* cited by examiner

COMMUNICATION METHOD, TERMINAL, AND NETWORK DEVICE

CROSS-REFERENCE TO RELATED APPLICATIONS

This application is a continuation of International Application No. PCT/CN2018/079654, filed on Mar. 20, 2018, which claims priority to Chinese Patent Application No. 201710167011.2, filed on Mar. 20, 2017. The disclosures of the aforementioned applications are hereby incorporated by reference in their entireties.

TECHNICAL FIELD

Embodiments of this application relate to the field of communications technologies, and in particular, to a communication method, a terminal, and a network device.

BACKGROUND

A random access radio network temporary identifier (RA-RNTI) is a scheduling identifier, and is used to identify, and perform addressing and scheduling on physical downlink control channel (PDCCH) signaling (order) of a random access response (RAR) sent by a base station to a terminal. In a long term evolution (LTE) system, after sending, on a physical random access channel (PRACH) resource, a preamble sequence (preamble) to a base station, a terminal needs to blindly detect, in a random access response window, PDCCH signaling sent by the base station. One random access response window corresponds to one physical random access channel (PRACH) resource. In the prior art, a start location of the random access response window is the third subframe after the last subframe in which the preamble sequence is sent, and a window length is indicated by the base station by using system information.

In the prior art, the terminal and the base station may determine the RA-RNTI by using a formula (1):

$$\text{RA-RNTI} = 1 + t\_id + 10 \times f\_id \quad (1)$$

where, t_id ($0 \le t\_id < 10$) is a subframe number of a subframe in which a PRACH resource used by the terminal to send the preamble is located, and f_id is a resource index number of this PRACH resource in frequency domain in this subframe. In an FDD system, each subframe has only one frequency domain resource to send a preamble, and therefore f_id is always 0. In a TDD system, $0 \le f\_id < 6$. It can be learned from the foregoing formula that, after sending a preamble on a PRACH resource, the terminal can deduce f_id of the PRACH resource on which the preamble is sent, calculate a unique RA-RNTI by using the formula (1), and receive, based on the calculated RA-RNTI, PDCCH signaling used to schedule an RAR.

In a next generation communications system, for example, in a new radio (NR) system, the system supports dividing system bandwidth into a plurality of sub-bands and/or sub-timeslots. Each sub-band and/or sub-timeslot may support a different subcarrier spacing, a different transmission time interval (TTI), or the like. In addition, a PRACH resource may exist in each sub-band and/or sub-timeslot. If there is one downlink sub-band and/or sub-timeslot that corresponds to two or more uplink sub-bands and/or sub-timeslots, in other words, no matter the terminal sends a preamble on a PRACH resource of which uplink sub-band and/or sub-timeslot, PDCCH signaling is received in the corresponding downlink sub-band and/or sub-timeslot. In this case, the terminal cannot deduce t_id and f_id of each PRACH resource. Therefore, when receiving PDCCH signaling across sub-bands and/or sub-timeslots, the terminal cannot deduce t_id and f_id of a PRACH resource on which a preamble is sent, consequently cannot determine an RA-RNTI, consequently cannot receive, by using the RA-RNTI, PDCCH signaling used to schedule an RAR, and consequently cannot complete random access.

Currently, when there are a plurality of PRACH resource locations, how a terminal detects and receives PDCCH signaling used to schedule an RAR is still a problem to be urgently resolved.

SUMMARY

This application provides a communication method, a terminal, and a network device, to resolve a problem of how a terminal detects and receives, when there are a plurality of PRACH resource locations, PDCCH signaling used to schedule an RAR.

An embodiment of this application provides a communication method. The method includes:

determining, by a terminal, a first identifier based on a resource index number of a first resource, where the resource index number of the first resource is preset, or is indicated by a network device, the first resource is a resource used to send a random access preamble, the first identifier is used to scramble first signaling, and the first signaling is used to schedule a random access response in a random access process; and detecting, by the terminal, the first signaling based on the first identifier.

According to the method provided in this embodiment of this application, the terminal determines the first identifier by using the resource index number of the first resource that is preset, or is indicated by the network device, and detects, based on the first identifier, the first signaling used to schedule the random access response in the random access process, so that the first signaling may be detected and received based on the determined first identifier when there are a plurality of first resource locations. This resolves a problem of how the terminal detects and receives, when there are the plurality of first resource locations, the first signaling used for scheduling.

Optionally, when the resource index number of the first resource is indicated by the network device, the resource index number of the first resource is determined by the terminal by using received broadcast information, or the resource index number of the first resource is determined by the terminal by using received dedicated signaling.

Optionally, a radio interface technology of the first resource is the same as a radio interface technology of second signaling, and the second signaling is used to trigger the terminal to initiate a random access process; or a radio interface technology of the first resource is a radio interface technology indicated by second signaling, and the second signaling is used to trigger the terminal to initiate a random access process; or a radio interface technology of the first resource is a radio interface technology indicated by a handover command received by the terminal, the handover command is forwarded by a source network device before handover of the terminal, after the source network device receives the handover command sent by the network device, and the handover command is used to instruct the terminal to be handed over from the source network device to the network device.

Optionally, the radio interface technology of the first resource and the radio interface technology of the second signaling are different, and if determining that the radio interface technology indicated by the second signaling includes at least one resource used to send the preamble, the terminal selects, from the at least one resource used to send the preamble, a resource as the first resource.

Optionally, the detecting, by the terminal, the first signaling based on the first identifier includes:

detecting, by the terminal, the first signaling based on the first identifier within a first time length that starts from a $Q^{th}$ second unit time after a first unit time, where the first time length is a sum of lengths of P third unit times, the first unit time is a unit time when transmission of the preamble is ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1; or if determining that the first signaling is not detected within a first time length based on the first identifier, detecting, by the terminal, the first signaling based on the first identifier within a second time length that starts at a moment when the first time length is ended, the second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1; or if determining that the first signaling is not detected within a first time length based on the first identifier, detecting, by the terminal, the first signaling based on the first identifier within a third time length that starts at a moment when the first time length is ended, the third time length is a difference between a sum of lengths of K fifth unit times and the first time length, the sum of the lengths of the K fifth unit times is greater than or equal to the first time length, the length of the fifth unit time is the same as a length of a unit time of the radio interface technology of the first resource or a length of a unit time of a reference radio interface technology, and K is a positive integer greater than or equal to 1.

An embodiment of this application provides a communication method. The method includes:

indicating, by a network device, a resource index number of a first resource to a terminal, where the first resource is a resource used to send a random access preamble; and receiving, by the network device, a preamble sent by the terminal on the first resource.

According to the method provided in this embodiment of this application, the network device indicates the resource index number of the first resource to the terminal, and the terminal determines the first identifier based on the resource index number of the first resource, so that the terminal can detect, based on the first identifier, first signaling used to schedule a random access response in a random access process. This resolves a problem of how the terminal detects and receives, when there are the plurality of first resource locations, the first signaling used for scheduling.

Optionally, the indicating, by a network device, a resource index number of a first resource to a terminal includes:

indicating, by the network device, the resource index number of the first resource to the terminal by using broadcast information, or indicating, by the network device, the resource index number of the first resource to the terminal by using dedicated signaling.

Optionally, after the indicating, by a network device, a resource index number of a first resource to a terminal, the method further includes:

sending, by the network device, second signaling to the terminal, where the second signaling indicates a radio interface technology of the first resource.

Optionally, the method further includes:

sending, by the network device, a handover command to a source network device before handover of the terminal, where the handover command indicates the radio interface technology of the first resource.

An embodiment of this application provides a terminal, including:

a processing unit, configured to determine a first identifier based on a resource index number of a first resource, where the resource index number of the first resource is preset, or is indicated by a network device, the first resource is a resource used to send a random access preamble, the first identifier is used to scramble first signaling, and the first signaling is used to schedule a random access response in a random access process; and a transceiver unit, configured to detect the first signaling based on the first identifier.

Optionally, when the resource index number of the first resource is indicated by the network device, the resource index number of the first resource is determined by using received broadcast information, or the resource index number of the first resource is determined by using received dedicated signaling.

Optionally, a radio interface technology of the first resource is the same as a radio interface technology of second signaling, and the second signaling is used to trigger the terminal to initiate a random access process; or a radio interface technology of the first resource is a radio interface technology indicated by second signaling, and the second signaling is used to trigger the terminal to initiate a random access process; or a radio interface technology of the first resource is a radio interface technology indicated by a handover command received by the terminal, the handover command is forwarded by a source network device before handover of the terminal, after the source network device receives the handover command sent by the network device, and the handover command is used to instruct the terminal to be handed over from the source network device to the network device.

Optionally, the radio interface technology of the first resource and the radio interface technology of the second signaling are different, and if determining that the radio interface technology indicated by the second signaling includes at least one resource used to send the preamble, the terminal selects, from the at least one resource used to send the preamble, a resource as the first resource.

Optionally, the transceiver unit is specifically configured to:

detect the first signaling based on the first identifier within a first time length that starts from a $Q^{th}$ second unit time after a first unit time, where the first time length is a sum of lengths of P third unit times, the first unit time is a unit time when transmission of the preamble is ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1; or if determining that the first signaling is not detected within a first time length based on the first identifier, detect the first signaling based on the first identifier within a second time length that starts at a moment when the first time length is ended, the second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1; or if determining that the first signaling is not detected within a first time length based on the first identifier, detect the first signaling based on the first identifier within a third time length that starts at a moment when the first time length is ended, the third time length is a difference between a sum of lengths of K fifth unit times and the first time length, the sum of the lengths of the K fifth unit times is greater than or equal to the first time length, the length of the fifth unit time is the same as a length of a unit time of the radio interface technology of the first resource or a length of a unit time of a reference radio interface technology, and K is a positive integer greater than or equal to 1.

An embodiment of this application provides a network device, including:

a processing unit, configured to indicate a resource index number of a first resource to a terminal by using a transceiver unit, where the first resource is a resource used to send a random access preamble; and a transceiver unit, configured to receive a preamble sent by the terminal on the first resource.

Optionally, the transceiver unit is specifically configured to:

indicate the resource index number of the first resource to the terminal by using broadcast information, or indicate the resource index number of the first resource to the terminal by using dedicated signaling.

Optionally, the transceiver unit is further configured to:

send second signaling to the terminal, where the second signaling indicates a radio interface technology of the first resource.

Optionally, the transceiver unit is further configured to:

send a handover command to a source network device before handover of the terminal, where the handover command indicates the radio interface technology of the first resource.

An embodiment of this application provides a terminal, including:

a processor, configured to determine a first identifier based on a resource index number of a first resource, where the resource index number of the first resource is preset, or is indicated by a network device, the first resource is a resource used to send a random access preamble, the first identifier is used to scramble first signaling, and the first signaling is used to schedule a random access response in a random access process; and a transceiver, configured to detect the first signaling based on the first identifier.

Optionally, when the resource index number of the first resource is indicated by the network device, the resource index number of the first resource is determined by using received broadcast information, or the resource index number of the first resource is determined by using received dedicated signaling.

Optionally, a radio interface technology of the first resource is the same as a radio interface technology of second signaling, and the second signaling is used to trigger the terminal to initiate a random access process; or a radio interface technology of the first resource is a radio interface technology indicated by second signaling, and the second signaling is used to trigger the terminal to initiate a random access process; or a radio interface technology of the first resource is a radio interface technology indicated by a handover command received by the terminal, the handover command is forwarded by a source network device before handover of the terminal, after the source network device receives the handover command sent by the network device, and the handover command is used to instruct the terminal to be handed over from the source network device to the network device.

Optionally, the radio interface technology of the first resource and the radio interface technology of the second signaling are different, and if determining that the radio interface technology indicated by the second signaling includes at least one resource used to send the preamble, the terminal selects, from the at least one resource used to send the preamble, a resource as the first resource.

Optionally, the transceiver is specifically configured to:

detect the first signaling based on the first identifier within a first time length that starts from a $Q^{th}$ second unit time after a first unit time, where the first time length is a sum of lengths of P third unit times, the first unit time is a unit time when transmission of the preamble is ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1; or if determining that the first signaling is not detected within a first time length based on the first identifier, detect the first signaling based on the first identifier within a second time length that starts at a moment when the first time length is ended, the second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1; or if determining that the first signaling is not detected within a first time length based on the first identifier, detect the first signaling based on the first identifier within a third time length that starts at a moment when the first time length is ended, the third time length is a difference between a sum of lengths of K fifth unit times and the first time length, the sum of the lengths of the K fifth unit times is greater than or equal to the first time length, the length of the fifth unit time is the same as a length of a unit time of the radio interface technology of the first resource or a length of a unit time of a reference radio interface technology, and K is a positive integer greater than or equal to 1.

An embodiment of this application provides a network device, including:

a BBU, configured to indicate a resource index number of a first resource to a terminal by using an RRU, where the first resource is a resource used to send a random access preamble; and the RRU, configured to receive a preamble sent by the terminal on the first resource.

Optionally, the RRU is specifically configured to:

indicate the resource index number of the first resource to the terminal by using broadcast information, or indicate the resource index number of the first resource to the terminal by using dedicated signaling.

Optionally, the RRU is further configured to:

send second signaling to the terminal, where the second signaling indicates a radio interface technology of the first resource.

Optionally, the RRU is further configured to:

send a handover command to a source network device before handover of the terminal, where the handover command indicates the radio interface technology of the first resource.

In a possible design, the network device provided in this application may include corresponding modules configured to perform behavior of the network device in the foregoing method designs. The modules may be software and/or hardware.

In a possible design, the terminal provided in this application may include corresponding modules configured to perform behavior of the terminal in the foregoing method designs. The modules may be software and/or hardware.

According to another aspect of this application, a computer-readable storage medium is provided. The computer-readable storage medium stores an instruction, and when being run on a computer, the instruction enables the computer to perform the method according to the foregoing aspects.

According to another aspect of this application, a computer program product including an instruction is provided, and when being run on a computer, the instruction enables the computer to perform the method according to the foregoing aspects.

DESCRIPTION OF EMBODIMENTS

The embodiments of this application may be applied to various mobile communications systems, such as: a global system for mobile communications (GSM) system, a code division multiple access (CDMA) system, a wideband code division multiple access (WCDMA) system, a general packet radio service (GPRS), a long term evolution (LTE) system, an advanced long term evolution (LTE-A) system, a universal mobile telecommunications system (UMTS), an evolved long term evolution (eLTE) system, an NR system and other mobile communications systems.

Figure 1:
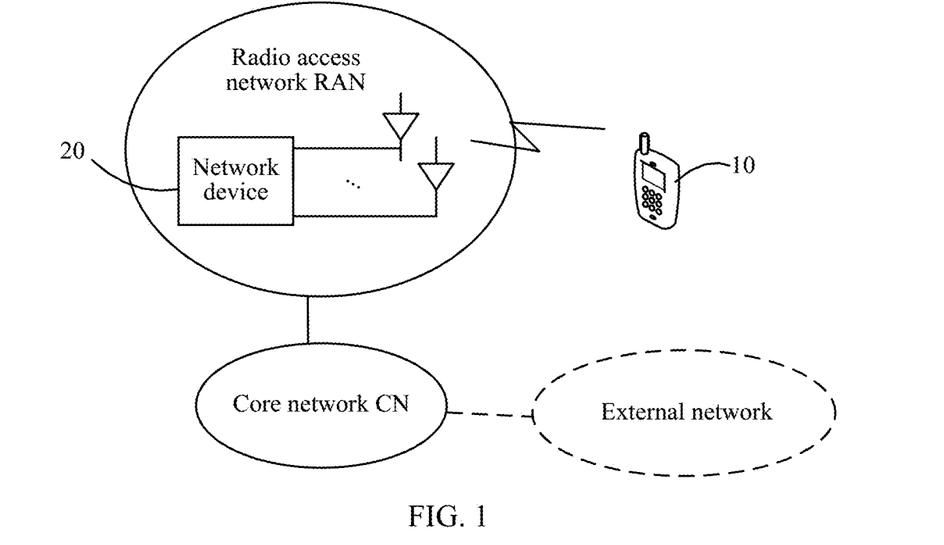
FIG. 1 is a schematic diagram of a system network applicable to an embodiment of this application.

FIG. 1 is a schematic diagram of a system network applicable to an embodiment of this application. As shown in FIG. 1, at least one terminal 10 communicates with a radio access network (RAN). The RAN includes at least one network device 20. To be clear, the figure shows only one network device 20 and one terminal 10. The RAN is connected to a core network (CN). Optionally, the CN may be coupled to one or more external networks, for example, the Internet and a public switched telephone network (PSTN).

In the following, some terms in this application are described, to help a person skilled in the art have a better understanding.

(1) A terminal may also be referred to as user equipment (UE), is a device having a communication function, may provide a voice and/or data service to a user, and may include a handheld device, an in-vehicle device, a wearable device, or a computing device having a wireless communication function, or another processing device connected to a wireless modem, or the like. The terminal may be referred to as different names in different networks, for example, user equipment, a mobile station, a user unit, a station, a cellular phone, a personal digital assistant, a wireless modem, a wireless communications device, a handheld device, a laptop computer, a cordless telephone set, or a wireless local loop station. For ease of description, the terminal device is referred to as a terminal for short in this application.

(2) A network device may be a base station (BS for short), or a device having a wireless receiving and sending function, such as a radio access device in a cloud network or a relay station, and is a device deployed on a radio access network to provide the wireless communication function. In different radio access systems, the base station may have different names. For example, in a universal mobile telecommunications system (UMTS for short) network, the base station is referred to as a NodeB; in an LTE network, the base station is referred to as an evolved NodeB (eNB or eNodeB for short); in a future 5G system, the base station may be referred to as a transmission reception point (TRP) network node or a g-NodeB (gNB).

(3) A radio interface technology (RIT) may be further referred to as a numerology or a long term evolution (LTE) technology, and the radio interface technology may include one or more of the following: a subcarrier spacing, a cyclic prefix length, a multiple access manner, a modulation and coding scheme (MCS), a frame structure, a physical channel, a transport channel, a logical channel (LCH), medium access control (MAC), radio link control (RLC), packet data convergence protocol (PDCP), radio resource control (RRC), a primary synchronization channel (P-SCH), a secondary synchronization channel (S-SCH), and the like.

Different radio interface technologies can satisfy different bandwidth and delay requirements of different services. Different radio interface technologies may be configured for a same terminal in a frequency division or time division manner. In different radio interface technologies, there may be different physical random access channel PRACH resources. As shown in FIG. 1, two numerologies exist in one cell in the frequency division manner. A transmission timing interval (TTI) of a numerology 1 is longer than a TTI of a numerology 2. In the numerology 1, there is a long-period PRACH resource. In the numerology 2, there is a short-period PRACH resource.

Figure 2:
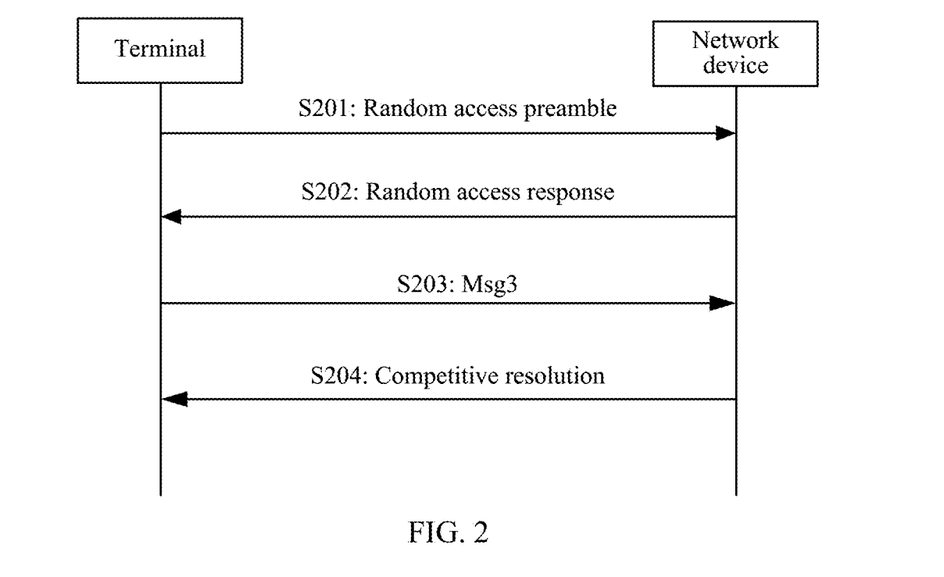
FIG. 2 is a schematic diagram of a contention-based random access process according to the prior art.

This embodiment of this application may be applied to contention-based random access, or may be applied to contention-free random access. FIG. 2 is a schematic diagram of a contention-based random access process according to the prior art.

S201: A terminal sends a random access preamble to a network device, where the preamble is sent on a physical random access channel (PRACH) resource. The message may also be referred to as a message 1 (Msg1).

S202: The network device returns a random access response (RAR) message to the terminal.

The message may also be referred to as a message 2 (Msg2).

After sending the preamble, the terminal listens to and detects, in an RAR window, first PDCCH signaling on a PDCCH. The first PDCCH signaling is scrambled by using an RA-RNTI, to schedule the RAR message sent to the terminal. If determining t_id and f_id of the PRACH resource on which the preamble is sent, the terminal may determine the RA-RNTI by using the formula (1), to detect the first PDCCH signaling based on the RA-RNTI, and receive the RAR message.

S203: The terminal sends a message 3 (Msg3) to the network device.

S204: The network device sends a contention resolution message to the terminal, where the message may also be referred to as a message 4 (Msg4).

Figure 3:
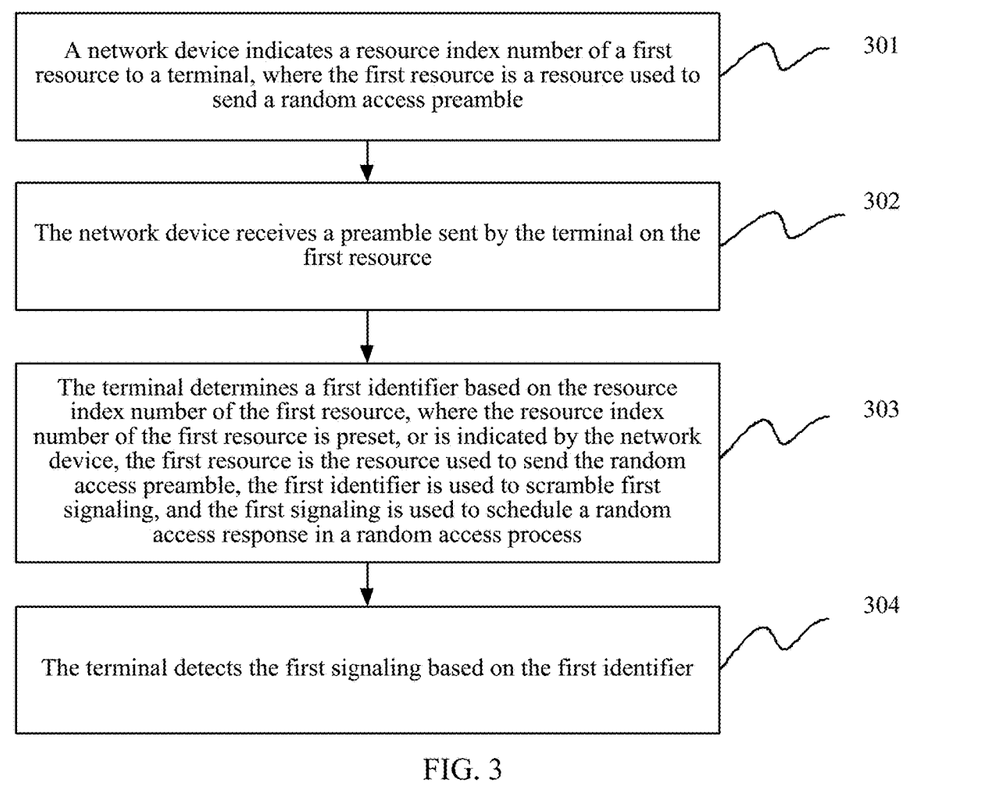
FIG. 3 is a schematic flowchart of a communication method according to an embodiment of this application.

Based on the foregoing description, FIG. 3 is a flowchart of a communication method according to an embodiment of this application. The method includes the following steps.

Step 301: A network device indicates a resource index number of a first resource to a terminal, where the first resource is a resource used to send a random access preamble.

The resource index number of the first resource is used to generate a first identifier that scrambles first signaling. Content of the first signaling and the first identifier is described in detail later.

It should be noted that, in this embodiment of this application, the first resource may be a PRACH resource, or another resource used to send a preamble.

Step 302: The network device receives a preamble sent by the terminal on the first resource.

Step 303: The terminal determines a first identifier based on the resource index number of the first resource, where the resource index number of the first resource is preset, or is indicated by the network device, the first resource is the resource used to send the random access preamble, the first identifier is used to scramble first signaling, and the first signaling is used to schedule a random access response in a random access process.

In this embodiment of this application, the first identifier may be an RA-RNTI determined by using the formula (1), or an identifier whose function is similar to that of the RA-RNTI. The first signaling may be PDCCH signaling that is used to schedule an RAR and that is sent by the network device after the network device receives the preamble sent by the terminal in the random access process, or signaling whose function is similar to that of the PDCCH signaling.

Step 304: The terminal detects the first signaling based on the first identifier.

In step 301, the network device may indicate the resource index number of the first resource to the terminal in a plurality of manners. In a possible implementation, the network device may indicate the resource index number of the first resource to the terminal by using broadcast information. In another possible implementation, the network device may indicate the resource index number of the first resource to the terminal by using dedicated signaling. The dedicated signaling may refer to signaling such as radio resource control signaling (RRC). In another possible implementation, the network device may indicate the resource index number of the first resource to the terminal in a manner of combining higher layer signaling and bottom layer signaling. For example, the network device may indicate a plurality of resource index numbers by using RRC signaling, and instruct, by using a media access control (MAC) control element (CE) or PDCCH signaling, the terminal to use one resource index number thereof, so that the network device flexibly changes the resource index number of the first resource. In another possible implementation, the network device may indicate the resource index number of the first resource to the terminal by using physical layer signaling. The physical layer signaling may refer to the PDCCH signaling.

Before step 302, the network device may further indicate, to the terminal, a radio interface technology of the first resource on which the preamble is sent. In a possible implementation, the network device may send second signaling to the terminal, where the second signaling indicates a radio interface technology of the first resource.

It should be noted that, the second signaling is used to trigger the terminal to initiate the random access process. For example, the second signaling may be PDCCH signaling that is sent by the network device to the terminal and that triggers the terminal to initiate the random access process, or signaling whose function is similar to the PDCCH signaling.

In another possible implementation, if the terminal is handed over from a source network device to the network device, in this case, the network device is a destination network device to which the terminal needs to be handed over, the network device may send a handover command to the source network device, and the handover command indicates the radio interface technology of the first resource. After receiving the handover command sent by the network device, the source network device forwards the handover command to the terminal, to indicate, to the terminal, the radio interface technology of the first resource on which the preamble is sent.

In step 302, after receiving the preamble sent by the terminal, the network device may determine the first identifier based on the resource index number of the first resource on which the terminal sends the preamble, and then send an RAR message to the terminal. The RAR message is scheduled by using the first signaling scrambled by using the first identifier. The terminal can receive the RAR message according to a scheduling indication of the first signaling only after first descrambling the first signaling by using the first identifier.

It should be noted that, the resource index number may uniquely indicate a time-frequency location of a resource. An implementation of the resource index number is not limited in this embodiment of this application. For details, refer to a stipulation in a system such as an LTE system. Details are not described herein again.

In step 303, before determining the first identifier, the terminal may first send the preamble to the network device on the first resource. Before sending the preamble, the terminal may first determine the radio interface technology for sending the first resource. In this embodiment of this application, the terminal may determine, in a plurality of manners, the radio interface technology for sending the first resource. In a first possible implementation, before sending the preamble, the terminal may receive the second signaling that is sent by the network device and that is used to trigger the terminal to initiate the random access process. In this case, the terminal may determine a radio interface technology of the second signaling. The terminal directly determines the radio interface technology of the second signaling as the radio interface technology of the first resource, in other words, in the implementation, the radio interface technology of the first resource is the same as the radio interface technology of the second signaling.

In a second possible implementation, after receiving the second signaling that is sent by the network device and that is used to trigger the terminal to initiate the random access process, the terminal determines, as the radio interface technology of the first resource, the radio interface technology indicated by the second signaling, in other words, in the implementation, the radio interface technology of the first resource is the radio interface technology indicated by the second signaling. The radio interface technology indicated by the second signaling may be a radio interface technology indicated by the PDCCH signaling, or may be a reference radio interface technology, or may be another radio interface technology, and may be specifically determined based on an actual situation. Details are not described herein. The reference radio interface technology may refer to a radio interface technology of a primary synchronization channel or a secondary synchronization signal, or a reference radio interface technology for a frequency interval stipulated by a protocol.

It should be noted that, when the radio interface technology of the first resource and the radio interface technology of the second signaling are different, if determining that the radio interface technology indicated by the second signaling includes at least one resource used to send the preamble, the terminal selects, from the at least one resource used to send the preamble, a resource as the first resource. It should be noted that, the terminal may randomly select a resource as the first resource on which the preamble is sent, or may select the first resource in another manner. Optionally, the terminal may not always select, as the first resource on which the preamble is sent, the first resource in the at least one resource on which the preamble is sent.

Figure 4:
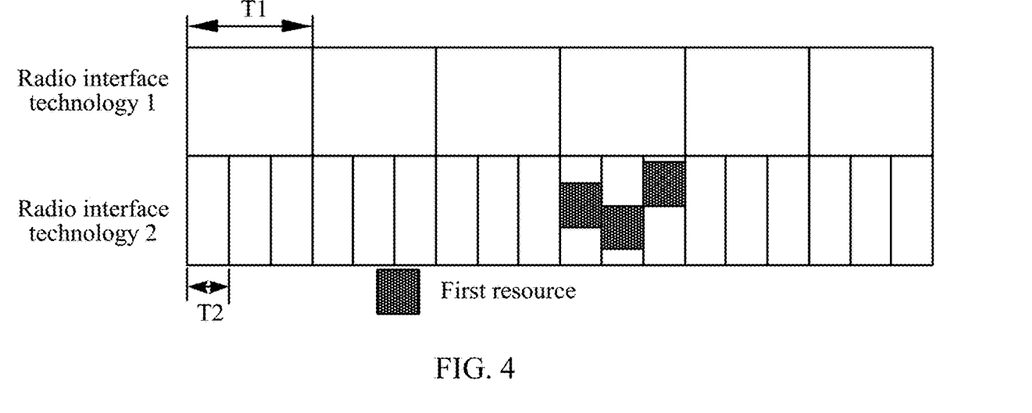
FIG. 4 is a schematic diagram of resource distribution according to an embodiment of this application.

For example, FIG. 4 is a schematic diagram of resource distribution according to an embodiment of this application. In FIG. 4, a TTI length of a radio interface technology 1 is T1, a TTI length of a radio interface technology 2 is T2, and a length of T1 is three times that of T1. A terminal receives second signaling in the radio interface technology 1, and the second signaling instructs the terminal to select a first resource in the radio interface technology 2 to send a preamble. Because there are a plurality of first resources in the radio interface technology 2, the terminal may randomly select a first resource as a resource on which the preamble is sent.

In a third possible implementation, in a process in which the terminal is handed over from a source network device to the network device (namely, a destination network device of the handover of the terminal) that is a destination, the terminal may need to send a preamble sequence to the network device. The network device sends a handover command to the source network device. The handover command is used to instruct the terminal to be handed over from the source network device to the network device. The network device may indicate a radio interface technology of the first resource to the terminal by using the handover command. In this case, after receiving the handover command sent by the network device, the source network device forwards the handover command to the terminal, so that the terminal determines the radio interface technology of the first resource.

After sending the preamble, the terminal may determine a first identifier based on a resource index number of the first resource on which the preamble is sent. In this embodiment of this application, the resource index number of the first resource may be preset, or may be indicated by the network device to the terminal, or may be determined by the terminal based on a distribution rule of first resources.

For example, when the resource index number of the first resource is preset, a location of the first resource is already fixed, and the terminal may directly determine the first identifier based on a preset resource index number. In this case, the terminal may send the preamble on a first resource in a reference radio interface technology, or may send the preamble on a first resource in any radio interface technology.

For another example, when the resource index number of the first resource is indicated by the network device to the terminal, the terminal may determine the resource index number of the first resource by using received broadcast information or received dedicated signaling, thereby determining the first identifier. In this case, the terminal may send the preamble on a first resource in a reference radio interface technology, or may send the preamble on a first resource in any radio interface technology. In this case, the terminal does not need to learn of a total quantity of first resources, and the terminal only needs to determine the resource index number of the first resource according to an indication of the network device.

For another example, when the resource index number of the first resource is indicated by the network device to the terminal, the terminal may determine the resource index number of the first resource based on a sequence of first resources in frequency domain. For example, the sequence of first resources in frequency domain is successively assigning resource index numbers in ascending order or descending order of frequencies, and the terminal may infer a resource index number of a first resource based on a frequency of the first resource. The sequence of first resources in frequency domain may be stipulated in a protocol, or may be indicated by a base station to the terminal by using broadcast information or dedicated signaling.

According to the foregoing method, after sending the preamble on the first resource, the terminal may determine the first identifier based on the preset resource index number of the first resource or the resource index number of the first resource indicated by the network device, so that when there are a plurality of first resource locations, the terminal may detect and receive the first signaling based on the determined first identifier.

In step 304, the terminal may detect the first signaling in an RAR window based on the first identifier. In this embodiment of this application, a start location and duration of the RAR window may have a plurality of implementations that are separately described in the following.

In a first possible implementation, the start location of the RAR window may be a start moment of a $Q^{th}$ second unit time after a first unit time, and the duration of the RAR window may be a first time length. The first time length is a sum of lengths of P third unit times, the first unit time is a unit time when transmission of the preamble is ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1.

It should be noted that, the unit time may be a time interval for scheduling a transport block (TB), for example, may be a time length such as a TTI (Transmission Time Interval). The unit time may alternatively be a subframe, or a time interval between two PDCCH monitoring occasions.

With reference to the foregoing description, in the implementation, the duration of the RAR window may be calculated based on the length of the unit time of the reference radio interface technology, or may be calculated based on a length of a unit time of the radio interface technology of the first resource on which the preamble is sent. Correspondingly, the start location of the RAR window may be calculated based on the length of the unit time of the reference radio interface technology, or may be calculated based on a length of a unit time of the radio interface technology of the first resource on which the preamble is sent.

In the implementation, the terminal may detect the first signaling based on the first identifier within the first time length that starts from the $Q^{th}$ second unit time after the first unit time.

It should be noted that, specific values of Q and P may be pre-agreed on by the terminal and the network device, or may be stipulated by a protocol, and are specifically determined based on an actual situation. This is not limited in this embodiment of this application.

In a second possible implementation, the start location of the RAR window may be a start moment of a $Q^{th}$ second unit time after a first unit time, and the duration of the RAR window may include a first time length and a second time length. The second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1.

In the implementation, if determining that the first signaling is not detected within a first time length based on the first identifier, the terminal detects the first signaling based on the first identifier within a second time length that starts at a moment when the first time length is ended. Specifically, within the first time length, the terminal may detect, on a radio resource in the radio interface technology of the first resource on which the preamble is sent, the first signaling based on the first identifier. If the first signaling is not detected, the terminal detects, on a radio resource in the reference radio interface technology within the second time length, the first signaling based on the first identifier. Certainly, within the first time length, the terminal may alternatively detect, on a radio resource in the reference radio interface technology, the first signaling. If the first signaling is not detected, within the second time length, the terminal detects, on a radio resource in a radio interface technology of the first resource on which the preamble is sent, the first signaling.

It should be noted that, the radio resource may be a PDCCH channel or another time-frequency resource, and is not limited herein. In addition, a specific value of S may be pre-agreed on by the terminal and the network device, or may be stipulated by a protocol, and are specifically determined based on an actual situation. This is not limited in this embodiment of this application.

Figure 5:
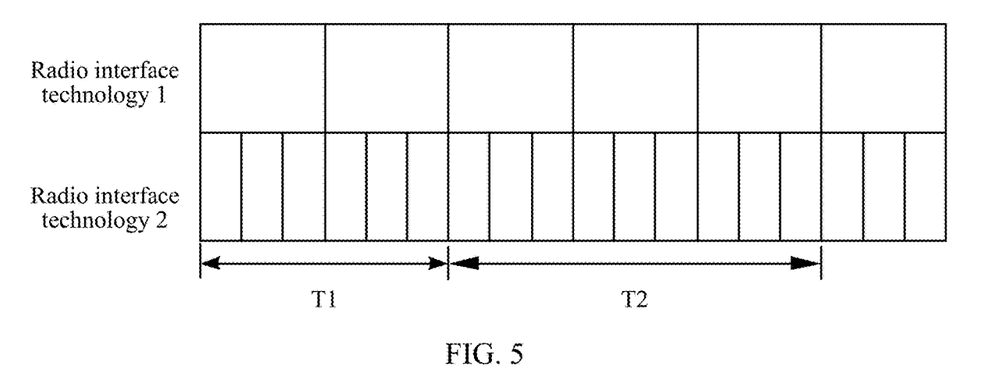
FIG. 5 is a schematic diagram of an RAR window according to an embodiment of this application.

For example, FIG. 5 is a schematic diagram of an RAR window according to an embodiment of this application. In FIG. 5, a radio interface technology 1 is a reference radio interface technology, a radio interface technology 2 is a radio interface technology of a first resource on which a preamble is sent, and a length of a unit time of the radio interface technology 1 is three times a length of a unit time of the radio interface technology 2. The RAR window includes a first time length T1 and a second time length T2. T1 includes a sum of lengths of unit times in six radio interface technologies 2, and T2 includes a sum of lengths of unit times in three radio interface technologies 1. Within T1, the terminal may detect, on a radio resource in the radio interface technology 2, first signaling based on a first identifier. If the first signaling is not detected, within T2, the terminal detects, on a radio resource in the radio interface technology 1, the first signaling based on the first identifier.

In a third possible implementation, the start location of the RAR window may be a start moment of a $Q^{th}$ second unit time after a first unit time, and the duration of the RAR window may include a first time length and a third time length. The third time length is a difference between a sum of lengths of K fifth unit times and the first time length, the length of the fifth unit time is the same as a length of a unit time of the radio interface technology of the first resource or a length of a unit time of a reference radio interface technology, and K is a positive integer greater than or equal to 1. The sum of the lengths of the K fifth unit times may be greater than the first time length. When the sum of the lengths of the K fifth unit times is less than or equal to the first time length, the third time length is 0.

In the implementation, if determining that the first signaling is not detected within the first time length, the terminal detects the first signaling based on the first identifier within a third time length that starts at a moment when the first time length is ended. Specifically, within the first time length, the terminal may detect, on a radio resource in the radio interface technology of the first resource on which the preamble is sent, the first signaling based on the first identifier. If the first signaling is not detected, the terminal detects, on a radio resource in the reference radio interface technology within the third time length, the first signaling based on the first identifier. Certainly, within the first time length, the terminal may alternatively detect, on a radio resource in the reference radio interface technology, the first signaling. If the first signaling is not detected, within the third time length, the terminal detects, on a radio resource in a radio interface technology of the first resource on which the preamble is sent, the first signaling. It should be noted that, when the third time length is 0, the terminal detects, only within the first time length, the first signaling.

It should be noted that, a specific value of K may be pre-agreed on by the terminal and the network device, or may be stipulated by a protocol, and are specifically determined based on an actual situation. This is not limited in this embodiment of this application.

Figure 6:
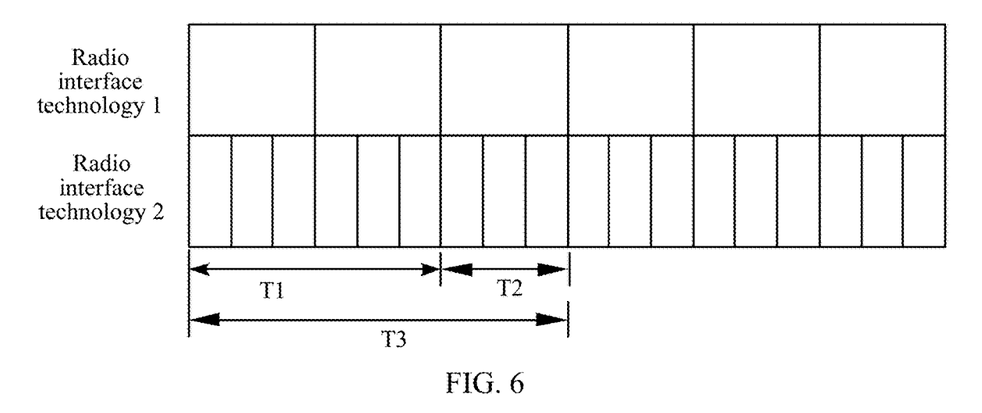
FIG. 6 is a schematic diagram of an RAR window according to an embodiment of this application.

For example, FIG. 6 is a schematic diagram of an RAR window according to an embodiment of this application. In FIG. 6, a radio interface technology 1 is a reference radio interface technology, a radio interface technology 2 is a radio interface technology of a first resource on which a preamble is sent, and a length of a unit time of the radio interface technology 1 is three times a length of a unit time of the radio interface technology 2. The RAR window includes a first time length T1 and a third time length T2. T1 includes a sum of lengths of unit times in six radio interface technologies 2, T2 is a difference between T3 and T1, and T3 is a sum of lengths of unit times in three radio interface technologies 1. Within T1, the terminal may detect, on a radio resource in the radio interface technology 2, first signaling based on a first identifier. If the first signaling is not detected, within T2, the terminal detects, on a radio resource in the radio interface technology 1, the first signaling based on the first identifier.

For another example, with reference to FIG. 6, if T2 is a difference between a sum of lengths of unit times in one radio interface technology 1 and T1, T2 is 0 in this case.

According to the foregoing method, when the terminal does not detect, within a first time period, the first signaling, the terminal may continue to detect, within a second time period or a third time period, the first signaling. If the first signaling is detected within the second time period or the third time period, a quantity of times of re-initiating a random access process can be reduced, thereby increasing an access speed of the terminal, and reducing an access delay of the terminal.

Different radio interface technologies have different unit times, and when one subframe may include a plurality of unit times and each unit time has a first resource on which a preamble is sent, one subframe may include a plurality of first resources. Therefore, the first identifier needs to be calculated by using a new method.

In this embodiment of this application, the first identifier may be calculated by using a formula (2):

$$\text{RA-RNTI}=1+\text{slot\_id}+(1+\text{max\_slot\_id})\times\text{f\_id} \quad (2)$$

where RA-RNTI is the first identifier, slot_id is an index value of the first resource, and the index value may be a number of the first resource, and is used to distinguish between different first resources in time domain. In time domain, one first resource may be used as a start first resource, an index value of the start first resource is set to 0, and then index values are successively set in chronological order for first resources after the start first resource. An index value that is set is incremented by 1 each time, until the index value has a maximum value max_slot_id. Then, an index value of a first resource after a first resource whose index value is the maximum value is set to 0 again, until an index value is set to the maximum value max_slot_id. This cycle goes round and begins again. A value of max_slot_id is related to the start location and the duration of the RAR window, and max_slot_id+1 may be greater than or equal to a maximum value of a quantity of first resources that may be included in time domain within a target time period. The target time period is a time period from a moment at which sending the preamble by the terminal is ended to a moment at which the RAR window is ended.

For example, the time period from the moment at which sending the preamble by the terminal is ended to the moment at which the RAR window is ended includes 10 unit time lengths, and each unit time length may include a maximum of one PRACH resource, a value of max_slot_id may be 9.

max_slot_id may alternatively be a largest quantity of first resources in time domain in one system frame.

In this embodiment of this application, the first identifier may alternatively be calculated by using a formula (3):

$$\text{RA-RNTI}=1+\text{t\_id}+\text{slot\_id}\times\text{max\_t\_id}+(1+\text{max\_slot\_id}\times\text{max\_t\_id})\times\text{f\_id} \quad (3)$$

where slot_id is an index value of a first resource in a subframe, and is used to distinguish between different first resources in time domain in a subframe. For a first resource in any subframe, an index value of the $1^{st}$ first resource is set to 0. Index values are successively set for first resources after this first resource, and an index value that is set is incremented by 1 each time, until the last first resource in the subframe. max_slot_id is a largest quantity of first resources in time domain in a subframe. For example, if in a subframe, there are five different first resources in time domain in a numerology, and there are seven different first resources in time domain in another numerology, max_slot_id is 7. max t_id is a quantity of subframes in a system frame, and in the prior art, max t_id is 10.

In LTE, to avoid cyclically scheduling the terminal by using PDCCH signaling, a semi-persistent scheduling (SPS) mechanism is provided. After an SPS resource is activated, the SPS resource cyclically appears, and the terminal cyclically receives downlink data or sends uplink data on the SPS resource.

In LTE, an SPS configuration exists only in a primary cell, and there is only one SPS configuration. Therefore, a hybrid automatic repeat request (HARQ) process identification (ID) of the SPS resource is provided by using the following formulas:

For a downlink SPS resource, an HARQ process $\text{ID}_{down}$ may be determined by using a formula (4):

$$\text{HARQ Process ID}_{down}=[\text{floor}(\text{CURRENT\_TTI}/\text{semi-PersistSchedIntervalDL})]\text{modulo numberOfConfSPS-Processes} \quad (4)$$

where CURRENT_TTI=[(SFN×10)+SN], SFN is a system frame number, SN is a subframe quantity, semiPersistSchedIntervalDL is a period of the downlink SPS resource, numberOfConfSPS_Processes is a largest quantity of downlink HARQ processes, floor( ) indicates a round-down operation, and modulo is a complementation operator.

For an uplink SPS resource, an HARQ process $\text{ID}_{up}$ may be determined by using a formula (5):

$$\text{HARQ Process ID}_{up}=[\text{floor}(\text{CURRENT\_TTI}/\text{semi-PersistSchedIntervalUL})]\text{modulo numberOfConfUlSPS\_Processes} \quad (5)$$

where CURRENT_TTI=[(SFN×10)+SN], SFN is a system frame number, SN is a subframe quantity, semiPersistSchedIntervalUL is a period of the uplink SPS resource, numberOfConfUlSPS_Processes is a largest quantity of uplink HARQ processes, floor( ) indicates a round-down operation, and modulo is a complementation operator.

In NR, different SPS resources may be configured in different numerologies. It may be learned that, when a cell has a plurality of SPS resources, a same HARQ process number may be calculated by using the foregoing formulas.

If different numerologies use a same HARQ entity, in other words, share an HARQ process in this HARQ entity, when a same HARQ process number is calculated for different SPS resources, HARQ retransmission cannot correspond to initial transmission.

To resolve the foregoing problem, a radio interface technology index number or an SPS configuration index number may be used as new parameters when the HARQ process ID is calculated. The following separately provides descriptions:

For a downlink SPS resource:

For an SPS configuration 1, the HARQ process ID may be calculated by using a formula (6):

$$\text{HARQ Process ID}=[\text{floor}(\text{CURRENT\_TTI}/\text{semiPersistSchedIntervalDL})]\text{modulo numberOfConfSPS\_Processes\_1} \quad (6)$$

For an SPS configuration 2, the HARQ process ID may be calculated by using a formula (7):

HARQ Process ID=numberOfConfSPS_Processes_1+[floor(CURRENT_TTI/semiPersistSchedIntervalDL)] modulo numberOfConfSPS_Processes_2    (7)

For an SPS configuration 3, the HARQ process ID may be calculated by using a formula (8):

HARQ Process ID=numberOfConfSPS_Processes_1+numberOfConfSPS_Processes_2+[floor(CURRENT_TTI/semiPersistSchedIntervalDL)] modulo numberOfConfSPS-Processes-3    (8)

In the foregoing formula (6) to formula (8), numberOfConfSPS_Processes_1, numberOfConfSPS_Processes_2, and numberOfConfSPS_Processes_3 refer to a largest quantity of HARQ processes allowed on each downlink SPS configuration.

For an uplink SPS resource:

For an SPS configuration 1, the HARQ process ID may be calculated by using a formula (9):

HARQ Process ID=[floor(CURRENT_TTI/semiPersistSchedIntervalUL)]modulo numberOfConfUlSPS_Processes_1    (9)

For an SPS configuration 2, the HARQ process ID may be calculated by using a formula (10):

HARQ Process ID=numberOfConfSPS_Processes_1+[floor(CURRENT_TTI/semiPersistSchedIntervalUL)] modulo numberOfConfUlSPS_Processes_2    (10)

For an SPS configuration 3, the HARQ process ID may be calculated by using a formula (11):

HARQ Process ID=numberOfConfSPS_Processes_1+numberOfConfSPS_Processes_2+[floor(CURRENT_TTI/semiPersistSchedIntervalUL)] modulo numberOfConfUlSPS_Processes_3    (11)

In the foregoing formula (9) to formula (11), numberOfConfUlSPS_Processes_1, numberOfConfUlSPS_Processes_2, and numberOfConfUlSPS_Processes_3 refer to a largest quantity of HARQ processes allowed on each uplink SPS configuration.

Based on a same technical idea, an embodiment of this application further provides a terminal. The terminal can perform the method procedure in FIG. 3.

Figure 7:
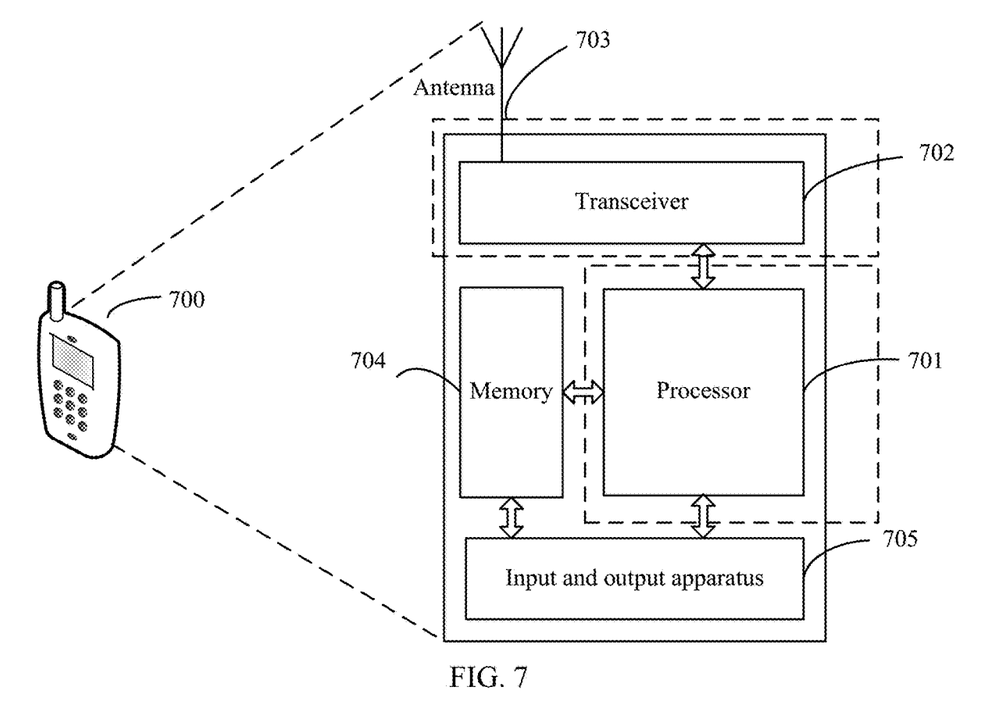
FIG. 7 is a schematic structural diagram of a terminal according to an embodiment of this application.

FIG. 7 is a schematic structural diagram of a terminal according to an embodiment of this application. For ease of description, FIG. 7 shows only main parts of the terminal. As shown in FIG. 7, a terminal 700 includes a processor 701, a transceiver 702, an antenna 703, a memory 704, and an input and output apparatus 705. The processor 701 is mainly configured to: process a communication protocol and communication data, control the entire terminal, execute a software program, and process software program data. The memory 704 is mainly configured to store the software program and data, for example, the codebook described in the foregoing embodiment. The transceiver 702 is mainly configured to: convert a baseband signal and a radio frequency signal to each other, and process the radio frequency signal. The antenna 703 is mainly configured to receive and send a radio frequency signal in a form of an electromagnetic wave. The input and output apparatus 705, for example, a touchscreen, a display screen, or a keyboard, is mainly configured to: receive data entered by a user and output data to the user.

After the terminal 700 is powered on, the processor 701 may read a software program in a storage unit, interpret and execute an instruction in the software program, and process data in the software program. When data needs to be wirelessly sent, after performing baseband processing on the to-be-sent data, the processor 701 outputs a baseband signal to a radio frequency circuit. After performing radio frequency processing on the baseband signal, the radio frequency circuit sends the radio frequency signal in a form of electromagnetic wave by using the antenna. When data is sent to the terminal 700, the radio frequency circuit in the transceiver 702 receives a radio frequency signal by using an antenna, converts the radio frequency signal into a baseband signal, and outputs the baseband signal to the processor 701, and the processor 701 converts the baseband signal into data and processes the data.

A person skilled in the art may understand that for ease of description, FIG. 7 shows only one memory and one processor. On an actual terminal, there may be a plurality of processors and memories. A memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal, execute a software program, and process data of the software program. The processor in FIG. 7 integrates functions of the baseband processor and the central processing unit. The person skilled in the art may understand that the baseband processor and the central processing unit may be respectively independent processors, and are interconnected by using a technology such as a bus. The person skilled in the art may understand that, the terminal may include a plurality of baseband processors to adapt to different network communications standards, the terminal may include a plurality of central processing units to enhance a processing capability of the terminal, and parts of the terminal may be connected by using various buses. The baseband processor may also be referred to as a baseband processing circuit or a baseband processing chip. The central processing unit may also be referred to as a central processing circuit or a central processing chip. A function of processing the communications protocol and the communication data may be set in the processor, or may be stored in the storage unit in a software program form. The processor executes the software program, to implement a baseband processing function.

Figure 8:
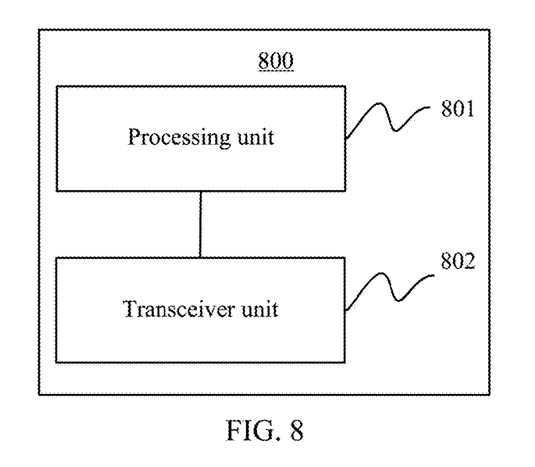
FIG. 8 is a schematic structural diagram of a terminal according to an embodiment of this application.

For example, in this embodiment of this application, an antenna and a transceiver having receiving and sending functions may be considered as a transceiver unit 802 of the terminal 700, and a processor having a processing function may be considered as a processing unit 801 of the terminal 700. As shown in FIG. 8, a terminal 800 includes the transceiver unit 802 and the processing unit 801. The transceiver unit 802 may also be referred to as a transceiver machine, a transceiver, a transceiver apparatus, or the like. Optionally, a component configured to implement a receiving function in the transceiver unit 802 may be viewed as a receiving unit, and a component configured to implement a sending function in the transceiver unit 802 may be viewed as a sending unit. That is, the transceiver unit 802 includes the receiving unit and the sending unit. For example, the receiving unit may also be referred to as a receiving machine, a receiver, a receiving circuit, or the like. The sending unit may be referred to as a transmitting machine, a transmitter, a transmitting circuit, or the like.

The terminal may be configured to implement the methods in the foregoing method embodiments, specifically:

a processor is configured to determine a first identifier based on a resource index number of a first resource, where the resource index number of the first resource is preset, or is indicated by a network device, the first resource is a resource used to send a random access preamble, the first identifier is used to scramble first signaling, and the first signaling is used to schedule a random access response in a random access process; and a transceiver is configured to detect the first signaling based on the first identifier.

Embodiments of the present invention further provide embodiments of apparatuses for implementing the steps and methods in the foregoing method embodiments. The methods, steps, technical details, and technical effects in the foregoing method embodiments are also applicable to the apparatus embodiments. No details are subsequently provided again.

Based on a same technical idea, an embodiment of this application further provides a network device. The network device can perform the method procedure in FIG. 3.

Figure 9:
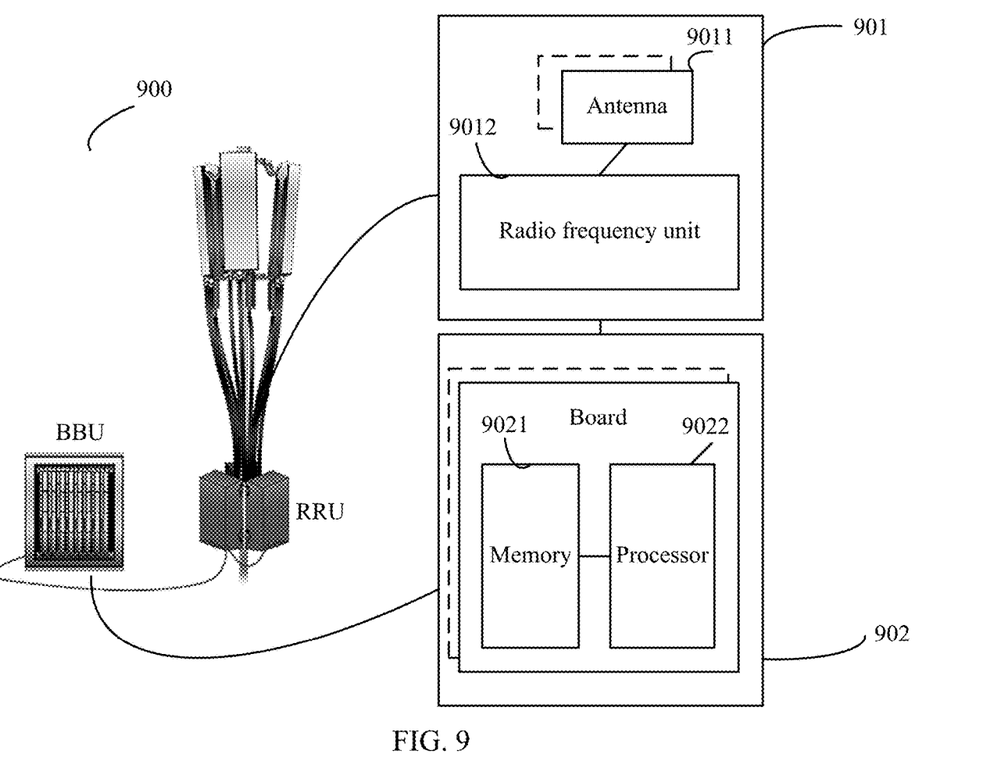
FIG. 9 is a schematic structural diagram of a network device according to an embodiment of this application.

FIG. 9 is a schematic structural diagram of a network device according to an embodiment of this application.

FIG. 9 is a schematic structural diagram of a network device, and the network device may be applied to the system shown in FIG. 1. A network device 900 includes one or more remote radio units (RRU) 901 and one or more baseband units (BBU) 902. The RRU 901 may be referred to as a transceiver unit, a transceiver, a transceiver circuit, a transceiver machine, or the like. The RRU 901 may include at least one antenna 9011 and radio frequency unit 9012. An RRU 901 part is mainly configured to: receive and send a radio frequency signal, and convert the radio frequency signal and a baseband signal to each other, for example, configured to send a signaling indication or a reference signal in the foregoing embodiments to a terminal. A BBU 902 part is mainly configured to: perform baseband processing, control the network device, and the like. The RRU 901 and the BBU 902 may be physically disposed together, or may be physically disposed separate from each other, that is, a distributed base station.

The BBU 902 is a control center of the network device, may also be referred to as a processing unit, and is mainly configured to complete baseband processing functions, such as channel coding, multiplexing, modulation, and spectrum spreading. In an example, the BBU 902 may include one or more boards, a plurality of boards may jointly support a radio access network (such as a 5G network) having a single access standard, or may respectively support radio access networks having different access standards. The BBU 902 further includes a memory 9021 and a processor 9022. The memory 9021 is configured to store an instruction and data that are necessary. The processor 9022 is configured to control the network device to perform a necessary action. The memory 9021 and the processor 9022 may serve one or more boards. That is, the memory and the processor may be disposed individually on each board. Alternatively, a plurality of boards may share the same memory and the same processor. In addition, a necessary circuit is disposed on each board.

Figure 10:
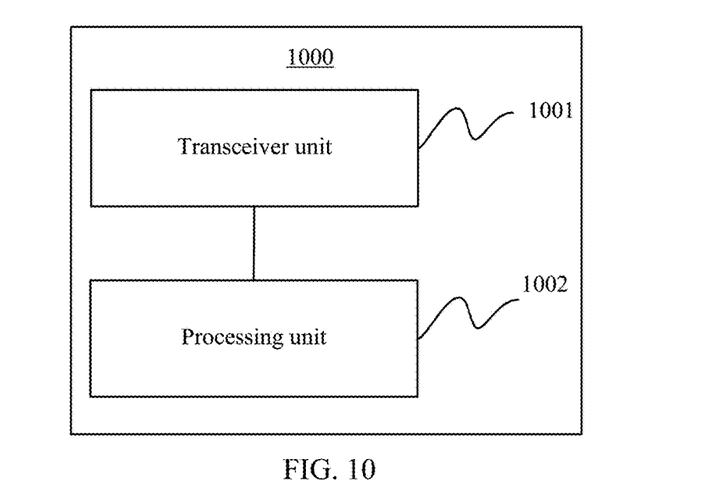
FIG. 10 is a schematic structural diagram of a network device according to an embodiment of this application.

For example, in this embodiment of this application, an antenna and a transceiver having receiving and sending functions may be considered as the transceiver unit of the network device 900, and a processor having a processing function may be considered as the processing unit of the network device 900. As shown in FIG. 10, a network device 1000 includes a transceiver unit 1001 and a processing unit 1002. The transceiver unit 1001 may also be referred to as a transceiver machine, a transceiver, a transceiver apparatus, or the like. Optionally, a component configured to implement a receiving function in the transceiver unit 1001 may be viewed as a receiving unit, and a component configured to implement a sending function in the transceiver unit 1001 may be viewed as a sending unit. That is, the transceiver unit 1001 includes the receiving unit and the sending unit. For example, the receiving unit may also be referred to as a receiving machine, a receiver, a receiving circuit, or the like. The sending unit may be referred to as a transmitting machine, a transmitter, a transmitting circuit, or the like.

The network device may be configured to implement the methods in the foregoing method embodiments, specifically:

the BBU 902 is configured to indicate a resource index number of a first resource to a terminal by using the RRU 901, where the first resource is a resource used to send a random access preamble; and the RRU 901 is configured to receive a preamble sent by the terminal on the first resource.

Embodiments of this application further provide embodiments of apparatuses for implementing the steps and methods in the foregoing method embodiments. The methods, steps, technical details, and technical effects in the foregoing method embodiments are also applicable to the apparatus embodiments. No details are subsequently provided again.

An embodiment of this application further provides a computer-readable storage medium, configured to store a computer software instruction that needs to be executed by the foregoing processor, and the computer-readable storage medium includes a program that needs to be executed by the foregoing processor.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive or Solid State Disk (SSD)), or the like.

Apparently, a person skilled in the art can make various modifications and variations to this application without departing from the scope of this application. This application is intended to cover these modifications and variations provided that they fall within the scope of protection defined by the following claims.

What is claimed is:

1. A communication method comprising:
   determining, by a terminal, a first identifier based on a resource index number of a first resource, wherein the resource index number of the first resource is preset, or is indicated by a network device, the first resource is used to send a random access preamble, the first identifier is used to scramble first signaling, and the first signaling is used to schedule a random access response in a random access process; and
   detecting, by the terminal, the first signaling based on the first identifier within a first time length that starts from a $Q^{th}$ second unit time after a first unit time, wherein the first time length is a sum of lengths of P third unit times, the first unit time is a unit time in response to transmission of the preamble being ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1; or
   in response to determining that the first signaling is not detected within a first time length based on the first identifier, implementing, by the terminal, one of the following (a) and (b):
   (a) detecting, the first signaling based on the first identifier within a second time length that starts at a moment in response to the first time length being ended, the second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1; and
   (b) detecting, the first signaling based on the first identifier within a third time length that starts at a moment in response to the first time length being ended, the third time length is a difference between a sum of lengths of K fifth unit times and the first time length, the sum of the lengths of the K fifth unit times is greater than or equal to the first time length, the length of the fifth unit time is the same as a length of a unit time of the radio interface technology of the first resource or a length of a unit time of a reference radio interface technology, and K is a positive integer greater than or equal to 1.

2. The method according to claim 1, wherein in response to the resource index number of the first resource being indicated by the network device, the resource index number of the first resource is determined by the terminal by using received broadcast information, or the resource index number of the first resource is determined by the terminal by using received dedicated signaling.

3. The method according to claim 1, wherein a radio interface technology of the first resource is the same as a radio interface technology of second signaling, and the second signaling is used to trigger the terminal to initiate a random access process.

4. The method according to claim 3, wherein the radio interface technology of the first resource and the radio interface technology of the second signaling are different, and in response to determining that the radio interface technology indicated by the second signaling comprises at least one resource used to send the preamble, the terminal selects, from the at least one resource used to send the preamble, a resource as the first resource.

5. The method according to claim 1 further comprising:
   indicating, by the network device, the resource index number of the first resource to the terminal, wherein the first resource is used to send the random access preamble; and
   receiving, by the network device, the preamble sent by the terminal on the first resource.

6. The method according to claim 5, wherein the indicating the resource index number of the first resource to the terminal comprises:
   indicating, by the network device, the resource index number of the first resource to the terminal by using broadcast information, or indicating, by the network device, the resource index number of the first resource to the terminal by using dedicated signaling.

7. The method according to claim 5, wherein after the indicating the resource index number of the first resource to the terminal, the method further comprises:
   sending, by the network device, second signaling to the terminal, wherein the second signaling indicates a radio interface technology of the first resource.

8. The method according to claim 5, further comprising:
   sending, by the network device, a handover command to a source network device before handover of the terminal, wherein the handover command indicates the radio interface technology of the first resource.

9. A terminal comprising:
   a processor, configured to determine a first identifier based on a resource index number of a first resource, wherein the resource index number of the first resource is preset, or is indicated by a network device, the first resource is used to send a random access preamble, the first identifier is used to scramble first signaling, and the first signaling is used to schedule a random access response in a random access process; and
   a transceiver, configured to cooperate with the processor to detect the first signaling based on the first identifier within a first time length that starts from a $Q^{th}$ second unit time after a first unit time, wherein the first time length is a sum of lengths of P third unit times, the first unit time is a unit time when transmission of the preamble is ended, a length of the second unit time is the same as a length of a unit time of the radio interface technology of the first resource or a length of a unit time of a reference radio interface technology, the length of the third unit time is the same as the length of the unit time of the radio interface technology of the first resource or the length of the unit time of the reference radio interface technology, Q is a positive integer greater than or equal to 0, and P is a positive integer greater than or equal to 1; or
   in response to determining that the first signaling is not detected within a first time length based on the first identifier, implement one of the following (a) and (b):
   (a) detecting the first signaling based on the first identifier within a second time length that starts at a moment when the first time length is ended, the second time length is a sum of lengths of S fourth unit times, the length of the fourth unit time is the same as a length of a unit time of the radio interface technology of the first resource or a length of a unit time of a reference radio interface technology, and S is a positive integer greater than or equal to 1; and (b) detecting the first signaling based on the first identifier within a third time length that starts at a moment when the first time length is ended, the third time length is a difference between a sum of lengths of K fifth unit times and the first time length, the sum of the lengths of the K fifth unit times is greater than or equal to the first time length, the length of the fifth unit time is the same as a length of a unit time of the radio interface technology of the first resource or a length of a unit time of a reference radio interface technology, and K is a positive integer greater than or equal to 1.

10. The terminal according to claim 9, wherein when the resource index number of the first resource is indicated by the network device, the resource index number of the first resource is determined by using received broadcast information, or the resource index number of the first resource is determined by using received dedicated signaling.

11. The terminal according to claim 9, wherein a radio interface technology of the first resource is the same as a radio interface technology of second signaling, and the second signaling is used to trigger the terminal to initiate a random access process; or
   a radio interface technology of the first resource is indicated by second signaling, and the second signaling is used to trigger the terminal to initiate a random access process; or
   a radio interface technology of the first resource is indicated by a handover command received by the terminal, the handover command is forwarded by a source network device before handover of the terminal, after the source network device receives the handover command sent by the network device, and the handover command instructs the terminal to be handed over from the source network device to the network device.

12. The terminal according to claim 11, wherein the radio interface technology of the first resource and the radio interface technology of the second signaling are different, and in response to determining that the radio interface technology indicated by the second signaling comprises at least one resource used to send the preamble, the terminal selects, from the at least one resource used to send the preamble, a resource as the first resource.

13. The method according to claim 1, wherein a radio interface technology of the first resource is indicated by second signaling, and the second signaling is used to trigger the terminal to initiate a random access process.

14. The method according to claim 1, wherein a radio interface technology of the first resource is indicated by a handover command received by the terminal, the handover command is forwarded by a source network device before handover of the terminal, after the source network device receives the handover command sent by the network device, and the handover command instructs the terminal to be handed over from the source network device to the network device.

* * * * *

UNITED STATES PATENT AND TRADEMARK OFFICE
CERTIFICATE OF CORRECTION

| | |
|---|---|
| PATENT NO. | : 11,044,761 B2 |
| APPLICATION NO. | : 16/577974 |
| DATED | : June 22, 2021 |
| INVENTOR(S) | : Liu et al. |

It is certified that error appears in the above-identified patent and that said Letters Patent is hereby corrected as shown below:

In the Claims

Claim 5 Column 22, Line 5: "5. The method according to claim 1 further comprising:" should read
-- 5. The method according to claim 1, further comprising: --.

Signed and Sealed this
Thirtieth Day of August, 2022

*Katherine Kelly Vidal*

Katherine Kelly Vidal
*Director of the United States Patent and Trademark Office*